F. A. ROSS.
MAGNETIC SPEEDOMETER.
APPLICATION FILED JUNE 30, 1916.

1,213,547.

Patented Jan. 23, 1917.
2 SHEETS—SHEET 1.

Witness
Inventor:
Frank A. Ross.
by Burton & Burton
his Attys.

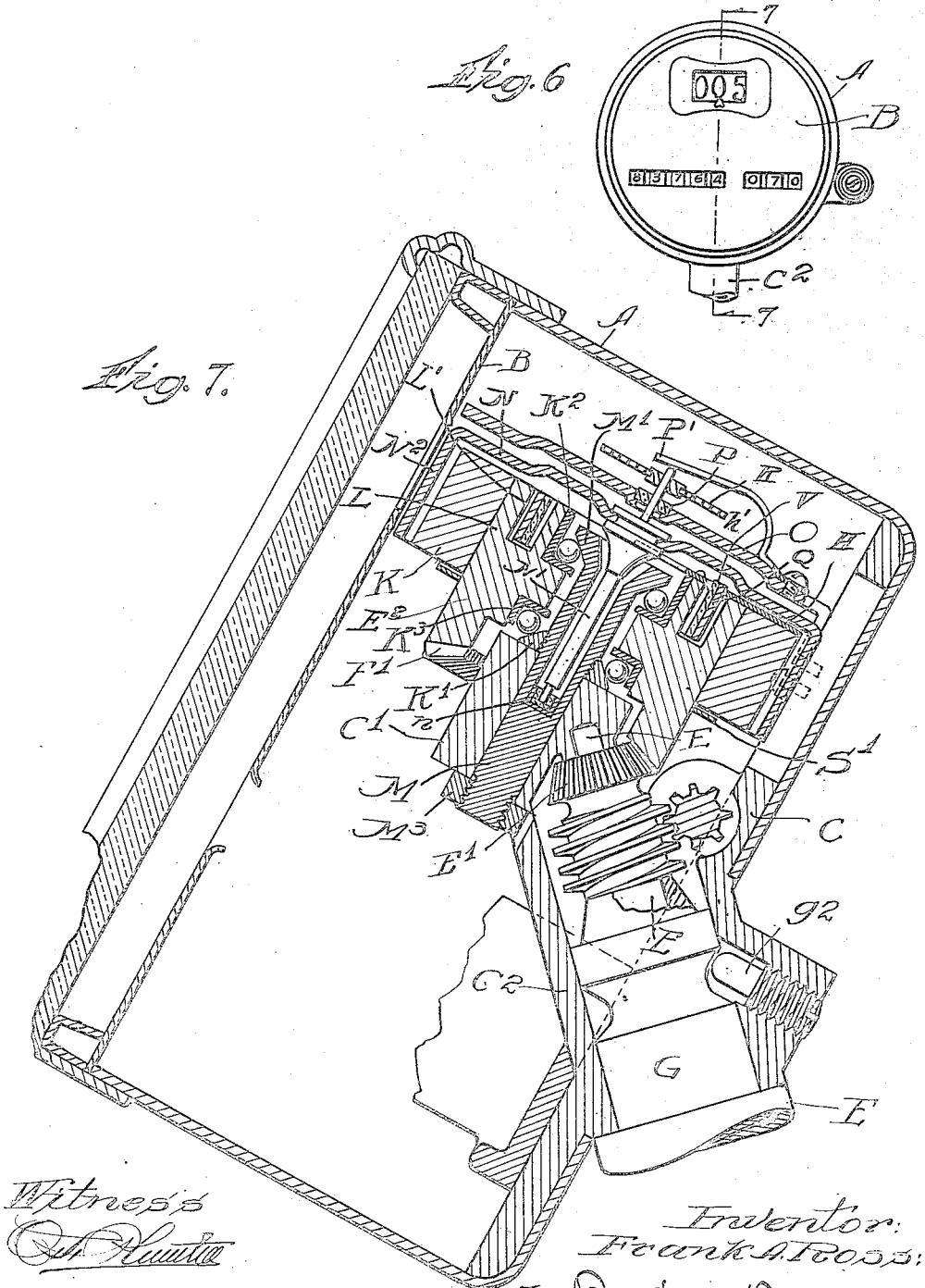

UNITED STATES PATENT OFFICE.

FRANK A. ROSS, OF CHICAGO, ILLINOIS, ASSIGNOR TO STEWART-WARNER SPEEDOMETER CORPORATION, OF CHICAGO, ILLINOIS, A CORPORATION OF VIRGINIA.

MAGNETIC SPEEDOMETER.

1,213,547.          Specification of Letters Patent.      Patented Jan. 23, 1917.

Application filed June 30, 1916. Serial No. 106,776.

*To all whom it may concern:*

Be it known that I, FRANK A. Ross, a citizen of the United States, residing at Chicago, in the county of Cook and State of Illinois, have invented new and useful Improvements in Magnetic Speedometers, of which the following is a specification, reference being had to the accompanying drawings, forming a part thereof.

The purpose of this invention is to provide an improved construction of a magnetic speedometer, particularly with respect to compactness and stability of the structure and with respect to means for calibrating and for thermostatic compensation for temperature variation.

It consists of the elements and features of construction shown and described as indicated in the claims.

Figure 1:
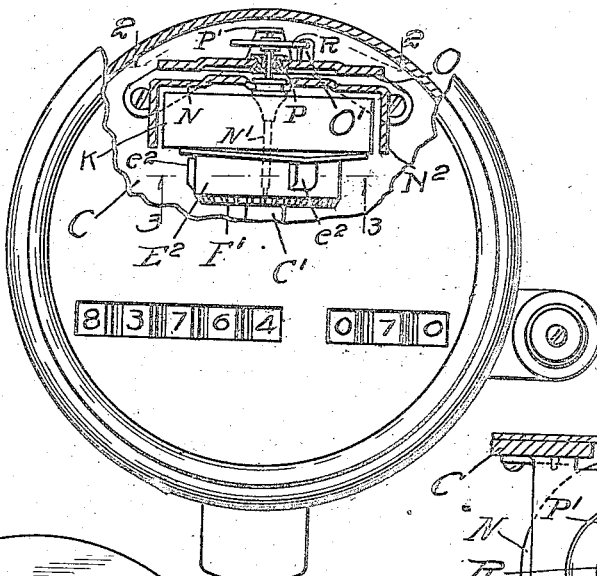
Figure 4:
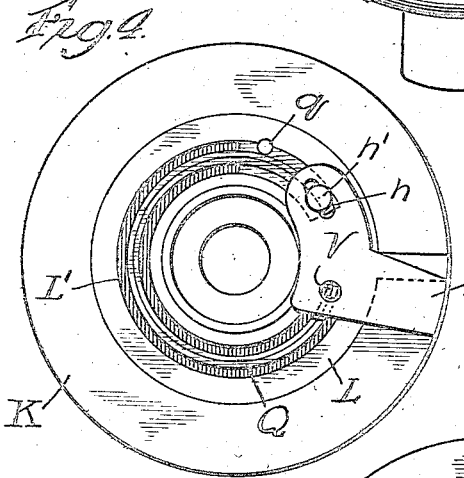
Figure 2:
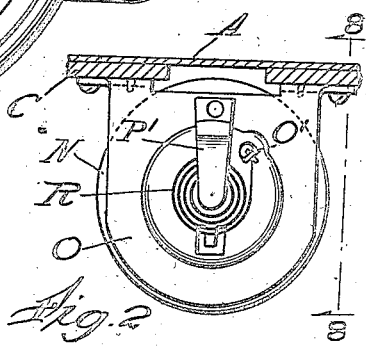
Figures 3, 5, 8:
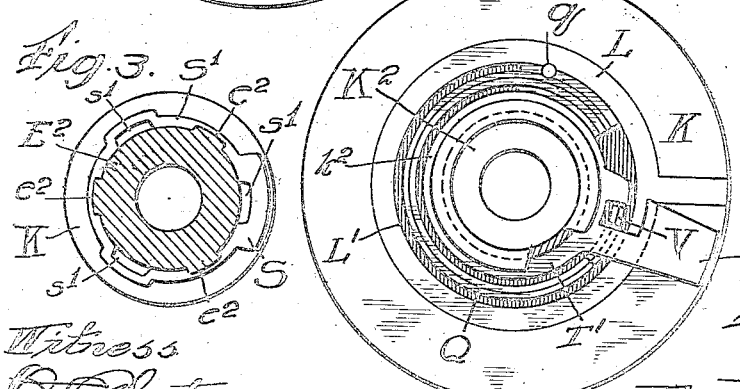

In the drawings: Figure 1 is a front elevation, partly sectional, of a speedometer embodying this invention, the dial plate and casing being partly broken away and a portion of the rotary devices being shown in axial section. Fig. 2 is a section at the line, 2—2, on Fig. 1. Fig. 3 is a section at the line 3—3, on Fig. 1. Fig. 4 is a top plan view of the magnet and mount and thermostatic temperature compensating devices therewith. Fig. 5 is a similar view showing a modified form of the thermostatic temperature compensating device. Fig. 6 is a face elevation of the instrument. Fig. 7 is a section at the line, 7—7, on Fig. 6 on a larger scale. Fig. 8 is a detail section at the line, 8—8, on Fig. 2.

The speedometer illustrated in the drawings comprises a cylindrical case, A, with a dial plate, B, inclosing one end of the cylindrical case, the rotating elements of the device being mounted on a support within the case for rotation about an axis parallel to the dial plate, and substantially in a plane diametric with respect to the cylindrical case, so that the rotating or oscillating drag element rotates in a plane transverse to the dial plate and has the speed graduations upon a cylindrical flange whose surface carrying said graduations is exposed through an aperture in the dial plate. The case and dial plate inclose and are positioned by a support comprising a plate, C, having a bracket-like lug, C¹, projecting from its forward side for holding the rotating and oscillating members of the speed-indicating device, said bracket being continuous with a hollow boss, C², projecting from the back of the plate through which and through said bracket the driving shaft, E, extends for carrying the beveled pinion, E¹, which meshes with a beveled gear, F¹, formed on the magnet mount, as hereinafter described, for rotating the magnet, the bearing, G, of said driving shaft, E, being fitted to telescope into said hollow boss and being retained in position therein by a set screw, $g^2$.

The magnet, K, is of the ring type and is carried by a magnet mount, L, of non-magnetic metal which occupies an outer annular portion of the central cavity of the ring magnet, being preferably extended into the magnet gap when the magnet is formed with such gap. The magnet mount, L, is provided with ball-bearings, steel ball races, K² and K³, being provided facing respectively upwardly and downwardly, rigidly mounted in said magnet mount, the lug or bracket, C¹, having a counterpart ball track for the lower ball race, K¹, the counterpart for the upper ball-race, K², being formed at M¹, on a bearing member, M, which is inserted down through the open center of the magnet mount and through the lug, C¹, which is apertured for that purpose, and secured rigidly to said lug by a nut, M³, on the lower end of said bearing member at the lower side of said lug. This bearing member, M, is axially bored to a considerable depth to receive a step bearing, preferably jeweled, shown at *n* for the spindle, N¹, of the drag disk, N, which occupies a position closely proximate to the upper side of the ring magnet in a plane parallel to said upper side and has a depending marginal flange or skirt, N², encompassing the ring magnet and exteriorly graduated for speed indication.

O is a field plate of magnetic metal secured bracket-wise to the supporting plate, C, and extending in a plane parallel to the upper side of the magnet and to the drag disk closely adjacent to the latter at the opposite side thereof from the magnet. In this field plate there is mounted a jewel bearing, P, for the portion of the spindle, N¹, which projects above the drag disk, for this purpose and also for the purpose of connecting thereto the inner end of the spiral biasing spring, R, whose outer end is secured to a post, O¹, on said field plate, O.

For the purpose of checking the vertical or axial movement of the drag disk and causing it to remain positioned at all times at substantially the same distance from the magnet and from the field plate, there is preferably provided a stop finger, P¹, mounted upon the top of the field plate and overhanging the upper end of the drag disk spindle, but not pressing upon the same when the latter is properly stepped in its lower bearing, but so close thereto as to check it against any substantial lifting from its said step bearing.

For the purpose of calibrating the instrument, there is mounted upon the under side of the split magnet a magnetic shunt device consisting of a segment of thin magnetic metal, S, formed as a projection from a narrow ring, S¹, which is mounted for rotation upon the cylindrical projection, E², of the mount which terminates in the beveled gear, F¹; and for so mounting said shunt in position to hold the segment, S, flat against the under side of the ring magnet, there are formed upon said cylindrical projection, E², slight radially projecting lugs, e², two or more of such lugs being provided circumferentially distributed around the cylindrical surface of said projecting portion of the mount each spaced away from the lower face of the magnet a sufficient distance to admit between them and said magnet said ring S¹ of the shunt device; and for the purpose of causing the segment, S, of said shunt device to be held snugly up against the under surface of the magnet, said ring is normally sprung out of its plane at the points at which it is to be engaged behind said lugs, so that by being flattened back into its proper plane for such engagement it is caused to react to press the segment projection snugly against the face of the magnet. For the purpose of facilitating the engagement of this calibrating shunt in the manner described between the lugs and the base of the magnet, the narrow ring portion thereof is provided with notches, s¹, in its inner circumference at distances apart corresponding to the positions of the several lugs e², so that the ring may be passed over the lugs into position against the face of the magnet and then rotated for engagement behind the lugs as indicated.

For the purpose of automatically by thermostatic device compensating for changes of temperature, there is provided upon the opposite side of the magnet from that at which the calibrating shunt device above described is mounted, another magnetic shunt element consisting of a thin piece of magnetic metal, H, which laps against the side of one pole of the magnet, and which may be moved so as to approach or recede from the other pole or lap more or less thereon; and for so moving it it is connected to the free end of a bi-metallic member, Q, which is bent in substantially circular form and amounts nearly to a complete ring having the other end fixed to the magnet mount, by the pin q, and said magnet mount having an annular recess, L¹, in the side at which said compensating shunt is mounted in which recess said bi-metallic member is lodged with freedom therein for the bending or change of curvature which will result from changes of temperature, causing the free end to move for moving the compensating shunt as described; and to cause said movement of said compensating shunt to be substantially about the axis of the magnet to move the shunt toward and from, or so as to cause it to lap more or less upon, the said other pole of the magnet, said shunt piece is provided with a slot, h, which is engaged by a stud, h¹, projecting from the face of the magnet mount, the curve of said slot being such as to cause the movement of the shunt resulting from its connection with the free end of the bi-metallic member to be as stated.

Fig. 7 shows a modification of the mode of mounting the temperature-compensating shunt, and of the form of said shunt for such mounting. In this form said shunt, indicated by T, consists of a segment projecting from a ring portion, T¹, which is mounted for movement about the axis of the magnet, this being most conveniently effected by journaling said ring portion upon the ball-race, K², said ball-race being provided with an outwardly-turned flange, k², for retaining the shunt device. The engagement of the shunt device with the free end of the bi-metallic thermostatic device in either form is by means of a slight projection, V, from the edge of said bi-metallic member engaging loosely an aperture or recess in the shunt device.

I claim:—

1. In a magnetic speedometer, a ring magnet in combination with a mount for the same of non-magnetic metal occupying the central aperture of the magnet; a thermostatic device let into the mount at one side and secured thereto at one end; a temperature compensating shunt piece connected to the other end of the thermostatic device and lapping laterally upon one pole of the magnet, the magnet mount and said shunt piece having one a slot and the other a stud engaging the slot for guiding the shunt piece in the movement caused by the thermostatic device.

2. In a magnetic speedometer, a ring magnet in combination with a mount for the same of non-magnetic metal which occupies the central aperture of the magnet; a calibrating device consisting of a thin ring of magnetic material having a radially-extended wing or segment for lapping laterally more or less on the magnet poles, the magnet mount having at intervals in its circumference slightly projecting lugs spaced away from the plane of the proximate face of the magnet and said ring being normally sprung out of its plane and engaged between said lugs and the magnet face so as to elastically press the segment projection against the side of the magnet.

3. In a magnetic speedometer, a ring magnet in combination with a mount for the same of non-magnetic metal occupying the central aperture of the ring, and projecting longitudinally therefrom at one side of the magnet; a calibrating shunt device consisting of a spring plate of magnetic material comprising a narrow ring portion and a relatively wide wing or segment projecting radially therefrom at a part of its circumference for lapping laterally on the magnet pole, said ring being mounted for rotation upon said projecting portion of the non-magnetic mount, said projection having at intervals in its circumference slight radially-projecting lugs spaced away from the proximate side of the magnet, and said ring portion of the shunt having in its inner circumference notches adapting it to pass over said lugs and be engaged behind them by rotation, and being normally sprung out of its plane at the points circumferentially removed from said notches so as to be flattened back into its plane when rotated into engagement behind the lugs, whereby it reacts to hold the wing pressed against the side of the magnet.

4. In a magnetic speedometer, a ring magnet in combination with a mount for the same of non-magnetic material occupying the central aperture of the ring; a temperature compensating shunt mounted upon said non-magnetic mount for movement substantially about the axis of the magnet and comprising a radially-projecting segmental portion lapping on one pole of the magnet, and a thermostatic device lodged in the mount and connected thereto and to said shunt piece for moving the latter about the magnet axis to cause its segmental projection to approach and depart from and to lap more or less on the other pole of the magnet.

In testimony whereof, I have hereunto set my hand at Chicago, Illinois, this 12th day of June, 1916.

FRANK A. ROSS.